United States Patent [19]
Acharya et al.

[11] Patent Number: 4,711,646
[45] Date of Patent: Dec. 8, 1987

[54] SINGLE COMPONENT ADSORPTION PROCESS

[75] Inventors: Arun Acharya, East Amherst; William E. Bevier, Kenmore, both of N.Y.

[73] Assignee: Union Carbide Corporation, Danbury, Conn.

[21] Appl. No.: 30,705

[22] Filed: Mar. 26, 1987

Related U.S. Application Data

[63] Continuation-in-part of Ser. No. 796,102, Nov. 8, 1985, abandoned.

[51] Int. Cl.[4] .................. B01D 53/04; B01D 53/06
[52] U.S. Cl. ......................................... 55/33; 55/34; 55/62; 55/75; 55/77
[58] Field of Search ................ 55/25, 26, 31, 33, 34, 55/35, 58, 60, 62, 68, 74, 75, 77, 78, 79

[56] References Cited

U.S. PATENT DOCUMENTS

| | | | |
|---|---|---|---|
| 2,340,390 | 2/1944 | MacMullin | 55/58 |
| 2,918,140 | 10/1959 | Brooks | 55/58 |
| 2,944,627 | 7/1960 | Skarstrom | 55/62 X |
| 3,006,438 | 10/1961 | Yarmett | 55/31 |
| 3,155,468 | 11/1964 | Montgareuil et al. | 55/25 |
| 3,252,268 | 5/1966 | Stark | 55/25 |
| 3,359,707 | 12/1967 | Jean | 55/33 |
| 3,944,400 | 3/1976 | Bird | 55/21 |
| 4,249,915 | 2/1981 | Sircar et al. | 55/26 |
| 4,299,596 | 11/1981 | Benkmann | 55/26 |
| 4,376,639 | 3/1983 | Vo | 55/26 |
| 4,376,640 | 3/1983 | Vo | 55/26 |
| 4,511,375 | 4/1985 | BeVier | 55/28 |
| 4,526,877 | 7/1985 | Acharya et al. | 502/60 |
| 4,627,856 | 12/1986 | von Gemmingen | 55/31 |

OTHER PUBLICATIONS

Chemical Engineers' Handbook, Perry et al, ed. 4th ed., 1969, McGraw-Hill Book Co., N.Y., pp. 16-19, 20.

Primary Examiner—Robert Spitzer
Attorney, Agent, or Firm—Stanley Ktorides

[57] ABSTRACT

A process to adbsorb a single component from a gaseous stream comprising passing the gaseous stream sequentially in contact with separate and distinct adsorbent masses wherein not all of the component is removed in a single adsorbent mass. The process exhibits improved overall efficiency over conventional single component processes.

20 Claims, 7 Drawing Figures

ADSORPTION

REGENERATION

FIG. 4
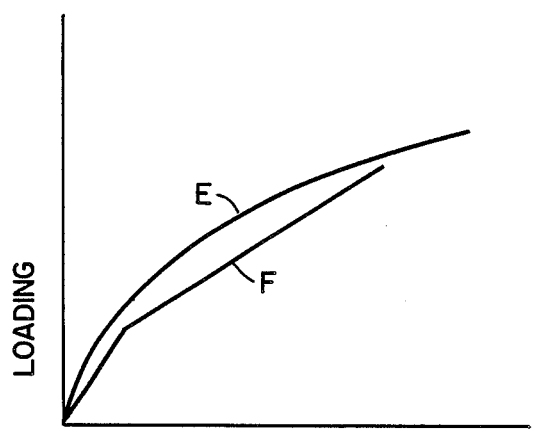
ADSORPTION
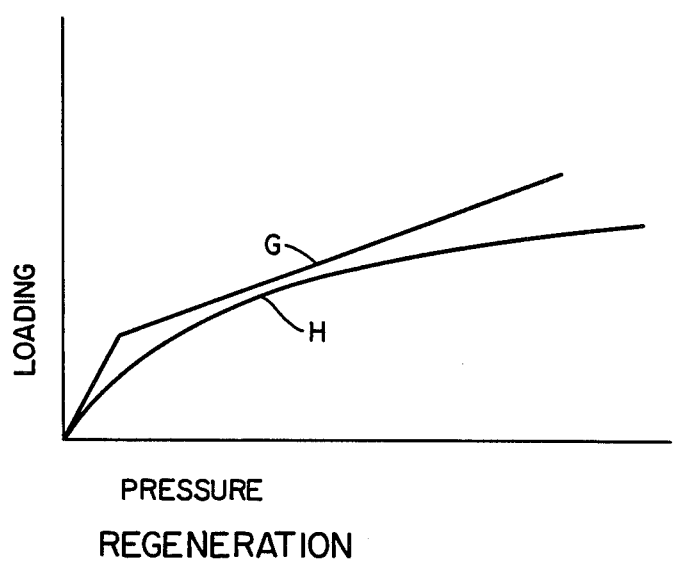
REGENERATION
FIG. 5

FIG. 6
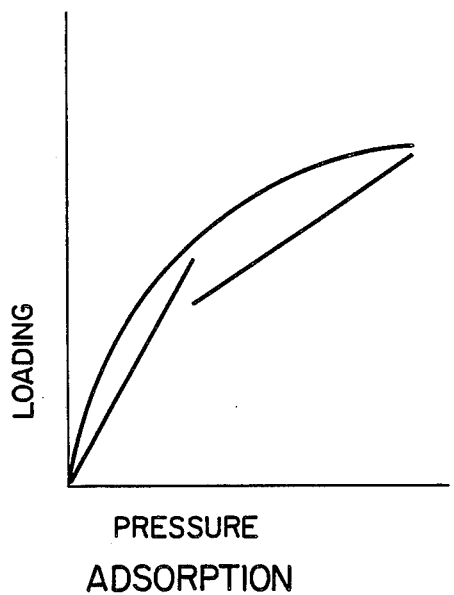
ADSORPTION
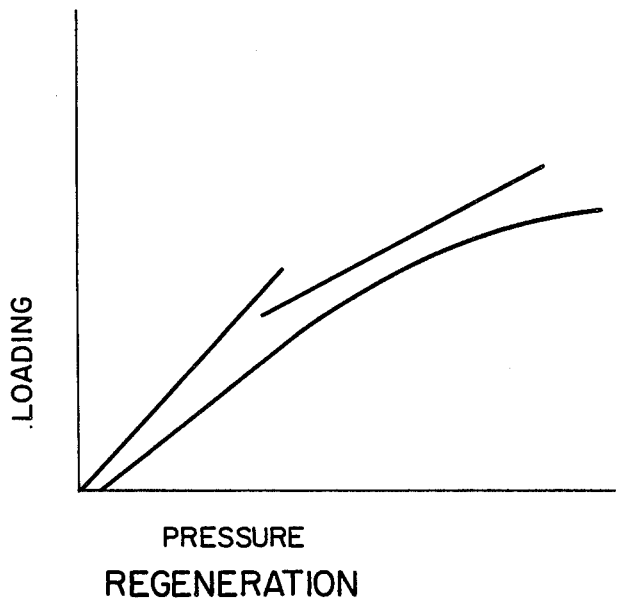
REGENERATION
FIG. 7

SINGLE COMPONENT ADSORPTION PROCESS

This application is a continuation-in part of prior U.S. application Ser. No. 796,102, filed Nov. 8, 1985, now abandoned.

TECHNICAL FIELD

This invention relates to the field of cleaning a gaseous stream of a single component by adsorption and is an improvement whereby energy efficiency is increased.

BACKGROUND ART

It is often necessary to remove a single component from a gaseous stream so as to clean the gaseous stream, recover the component, or both. Examples of such situations include the upgrading of natural gas, the purification of natural gas before liquefaction, removal of a contaminant from air for breathing, and removal of a high boiling component from air before cryogenic air separation. A widely used method to carry out such component removal is to contact the gaseous stream with adsorbent to transfer the component from the gaseous stream to the adsorbent. Generally the adsorbent is in a fixed or moving bed.

Heretofore, such a single component adsorption has been carried out by passing the component-containing gaseous stream through a single adsorbent bed which is sized accordingly as, for example, is described in U.S. Pat. No. 2,944,627 - Skarstrom. The conventional system has been advantageous because it entails relatively low capital costs and is relatively simple in operation. However, the conventional single component adsorption process uses a large amount of energy, and as energy costs have increased, it is desirable to provide a single component adsorption process which will enable effective removal of a single component from a gaseous stream while employing less energy than heretofore known conventional single component adsorption processes.

It is therefore an object of this invention to provide an improved process for the removal by adsorption of a single component from a gaseous stream.

It is a further object of this invention to provide an improved process for the removal by adsorption of a single component from a gaseous stream which is more energy efficient than heretofore known processes.

SUMMARY OF THE INVENTION

The above and other objects which will become apparent to one skilled in the art upon a reading of this disclosure are attained by the instant invention which is:

A process for the removal by adsorption of a single component from a gaseous stream comprising:

(a) passing a gaseous stream containing a component to be removed in contact with a first mass of adsorbent to transfer the majority of said component to the first mass of adsorbent and reduce the concentration of said component in the gaseous stream to within the range of from 5 to 50 ppm;

(b) passing the resulting gaseous stream in contact with a second mass of adsorbent, separate from the first mass of adsorbent, to transfer remaining component to the second mass of adsorbent and reduce the concentration of said component in the gaseous stream to less than 5 ppm;

(c) loading each of the adsorbent masses to at least 90 percent of its capacity;

(d) regenerating the first adsorbent mass to a high residual loading; and (e) regenerating the second adsorbent mass to a low residual loading.

As used herein, the term "component" means a chemically identifiable part of a gaseous stream which is removable from the gaseous stream by adsorption.

As used herein, the term "majority" means from at least 50 percent to less than 100 percent.

As used herein the term "fixed bed" means a bed in which the adsorbent particles are stationary relative to the vessel containing them.

As used herein, the term "moving bed" means a bed in which the adsorbent particles change position relative to the vessel containing them.

As used herein, the term "inert gas" means a gas which, relative to the component that is adsorbed, does not have significant adsorption tendency and therefore is essentially a carrier gas.

BRIEF DESCRIPTION OF THE DRAWINGS

FIG. 4 is a graphical representation of typical adsorption characteristics of a preferred embodiment of the dual-stage, single component adsorption process of this invention.

FIG. 5 is a graphical representation of typical desorption or regeneration characteristics of a preferred embodiment of the dual-stage, single component adsorption process of this invention.

FIG. 6 is a graphical representation of adsorption characteristics for another embodiment of the dual stage, single component adsorption process of this invention.

FIG. 7 is a graphical representation of desorption or regeneration characteristics for another embodiment of the dual stage, single component adsorption process of this invention.

DETAILED DESCRIPTION

The process of this invention will be described in detail with reference to the drawings.

Figure 1:
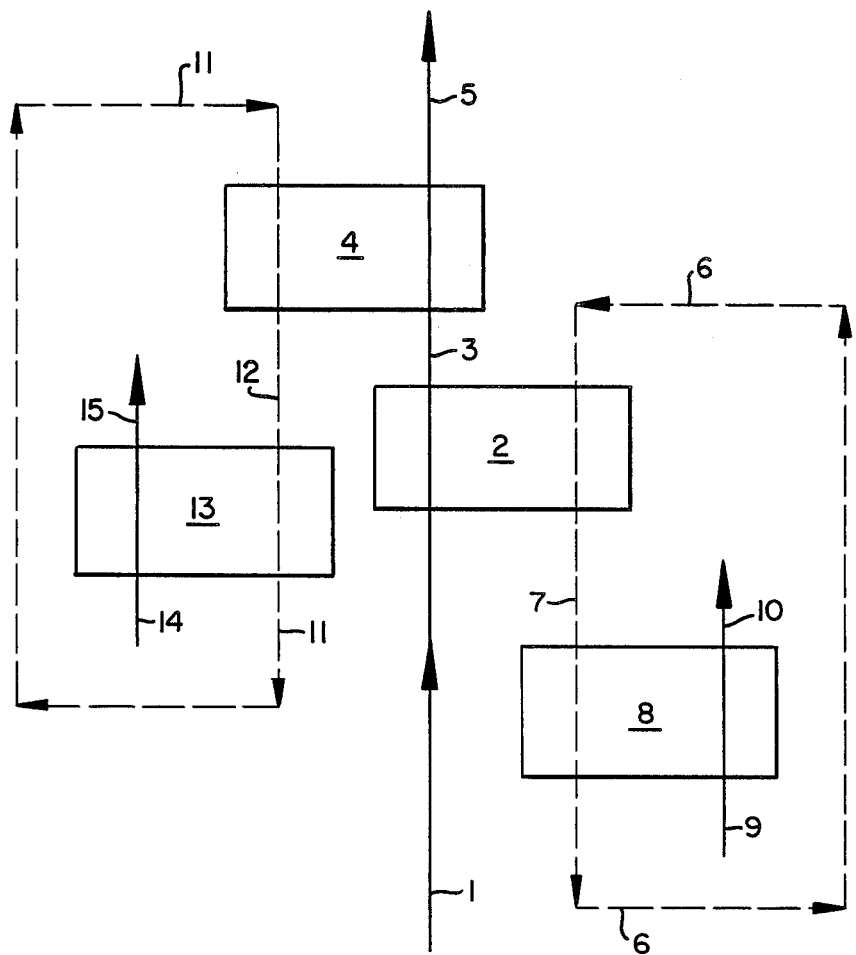
FIG. 1 is a schematic flow diagram of one preferred embodiment of the process of this invention wherein the gaseous stream is cleaned by passage through two moving adsorbent beds.

Referring now to FIG. 1, gaseous stream 1 contains a single component which is to be removed. Examples of such a gaseous stream include a gaseous stream of air with water or carbon dioxide to be removed, natural gas with water or carbon dioxide to be removed, hydrogen with ethylene or methane to be removed, and helium with carbon dioxide or methane to be removed. Gaseous stream 1 is passed in contact with a first mass of adsorbent in adsorber 2 which may be any effective means such as a fixed bed or a moving bed. If adsorber 2 is a moving bed it may be cocurrent, wherein the adsorbent and the gaseous stream move through the adsorber in the same direction, or it may be countercurrent wherein the adsorbent and the gaseous stream move through the adsorber in different directions. In the embodiment illustrated in FIG. 1, adsorber 2 is a countercurrent moving bed with adsorbent 6 passing countercurrent to gaseous stream 1.

By contact with the first mass of adsorbent by the gaseous stream, the majority of the component is transferred to the first mass of adsorbent. Preferably at least about 90 percent, most preferably at least about 95 percent, but preferably at most about 99.5 percent of the component, is transferred to the first mass of adsorbent. The gaseous stream leaves adsorber 2 with a component concentration within the range of from 5 to 50 ppm.

As is known in the art, the extent of adsorption of the component on the first mass of adsorbent is dependent on the process conditions, including the system pressure, temperature, amount of adsorbent available per unit of treated gas, the initial or residual loading of the adsorbent with regard to the component, and the extent of equilibrium between the treated gas and the adsorbent. The specific design for any given treated gas adsorbent system will depend on the system characteristics such as the governing loading curve for the adsorbent, the type of adsorption unit, and the type of regeneration unit. The system design would be controlled by those characteristics and the usual engineering design tradeoffs between equipment, material, and operating costs. The behavior of a given component on a given adsorbent is determined by experiment and can be represented on a loading curve of "Amount of Component Adsorbed per Unit Adsorbent" versus "Partial pressure of component over Adsorbent". Loading can be "lb moles gas" or "lbs gas per lb adsorbent" versus pressure "psia" for pure component or "concentration × total pressure" for a gas mixture. The basic principles of sorption separation processes are described in "The Chemical Engineer's Handbook" Fifth Edition, Editors R. H. Perry and C. H. Chilton, Section 15 "Adsorption and Ion Exchange".

Referring back to FIG. 1, resulting gaseous stream 3 is then contacted with a second mass of adsorbent which is separate from the first adsorbent mass. FIG. 1 illustrates the second adsorbent mass as being in adsorber 4 which, like adsorber 2, may be any effective means such as a fixed or countercurrent, cocurrent or even a crossflow moving bed. In the embodiment illustrated in FIG. 1, adsorber 4 is a countercurrent moving bed with adsorbent 11 passing countercurrent to gaseous stream 3. By contact with the second mass of adsorbent by the gaseous stream, substantially all of the remaining component undergoes transfer to the second mass of adsorbent. The resulting gaseous stream 5 containing less than 5 ppm and preferably substantially none of the component which was to be removed may be recovered, further processed, otherwise employed or simply released.

The first and second adsorbent may be any effective adsorbent. Preferably the first and second adsorbent mass comprise the same type of adsorbent but this is not absolutely necessary. Examples of types of adsorbents suitable for use as adsorbent masses in the process of this invention include molecular sieve, silica gel, activated carbon, and alumina. When the adsorption process is a moving bed process a preferred adsorbent is attrition resistant molecular sieve disclosed and claimed in U.S. Pat. No. 4,526,877 - Acharya et al, or silica and alumina gels which are available in hard spherical form and tend to be attrition resistant.

This invention is advantageously practiced only when both the first and second adsorbent masses are substantially fully utilized. This means that each adsorbent mass is loaded with adsorbate to near its maximum capacity at the given process conditions. Generally each of the adsorbent masses will be loaded to at least 90% of maximum capacity and preferably at least 95% of maximum capacity. This avoids regeneration energy waste otherwise associated with regeneration of unused or clean adsorbent.

The process of this invention differs from heretofore known single component adsorption systems which are characterized by having a single adsorbent bed in that the component is not completely removed in a single bed but rather in two separate and distinct beds. At first glance, such a system may be thought to be disadvantageous because of the increased capital costs of a second bed and the inherent increase in complexity of such a dual-stage system. However, it has been unexpectedly discovered that such a seemingly disadvantageous scheme is surprisingly much more energy-efficient than conventional single-stage systems and that the sharp increase in energy efficiency more than makes up for the increased capital costs. This advantageous result will now be more fully explained.

A commercially viable adsorption system includes the cleaning or regeneration of the adsorbent so that it may be employed anew to adsorb components from a gaseous stream. There are a number of known ways to clean adsorbent such as by pressure reduction or isobaric temperature increase of the adsorbent, simple purging of the adsorbent with large quantities of inert gas, or combinations of these systems. The energy required to clean the adsorbent is referred to as the desorption energy. All of these adsorbent cleaning systems exhibit the engineering principle that the first increments of contaminant may be removed from the adsorbent with relatively little energy usage, while later increments of contaminant require larger increments of desorption energy and the last increments of contaminant require very large increments of desorption energy. In a conventional single-stage system, the bed requires nearly complete cleaning, i.e., to low residual loading, in order to successfully carry out the complete removal of the component from the gaseous stream. However, in the process of this invention, the first adsorber need not be completely cleaned, i.e., it may have high residual loading, because it is not employed to remove the component completely. Rather, the first adsorber need be regenerated only to a high residual loading sufficient to clean adsorbate down to only the 5 to 50 parts per million (ppm) concentration level. This saves considerable desorption energy since the first adsorber is regenerated in the region of relatively low incremental desorption energy. Generally, high residual loading is a loading at least twice the loading of low residual loading. For example, in a system wherein water is the component to be removed and molecular sieve is the adsorbent, high residual loading is preferably at least 12, and low residual loading at most 6, pounds of water per 100 pounds of adsorbent.

FIG. 1 illustrates one type of desorption system. Referring back now to FIG. 1, adsorbent 7 containing the bulk of the component is passed to desorber 8 which may be any effective desorber such as a pressure swing or temperature swing desorber having one or more stages. A preferred desorber and regeneration process is disclosed and claimed in U.S. Pat. No. 4,511,375 - BeVier. In FIG. 1, first desorber 8 is shown as a single-stage stripper wherein purge gas 9 passes countercurrent to adsorbent 7 to produce high residual loaded adsorbent 6 and component-containing-purge gas 10. The purge gas may be any effective gas such as nitrogen or may be a fraction of the cleaned feed gas itself. Desorber 13 like desorber 8, may be any effective desorber and is shown in FIG. 1 as a simple stripper wherein purge gas 14 passes countercurrent to adsorbent 12 which contains the remaining part of the component. The desorption in second desorber 13 results in low residual loaded adsorbent 11 and purge gas 15 containing the remaining part of the component. In a preferred embodiment at least some of the purge gas exiting from the second desorber is used to make up at least part, and most preferably all, of the purge gas requirement entering the first desorber. In a further preferred embodiment, heat of desorption for both of the desorbers is added in a simple heater to clean purge gas prior to entering the second desorber. If a multiple zone desorber is employed, this heat addition takes place before the purge gas enters the stripping section. No further heat addition to the first desorber purge gas is necessary if the purge gas exiting the second desorber makes up at least part of the purge gas entering the first desorber.

Preferably the component concentration in the gaseous stream exiting the first adsorber is within the range of from 5 to 20 ppm, most preferably within the range of from 5 to 10 ppm. Preferably, the component concentration in the gaseous stream exiting the second adsorber is less than 2 ppm, most preferably less than 1 ppm.

Figure 2:
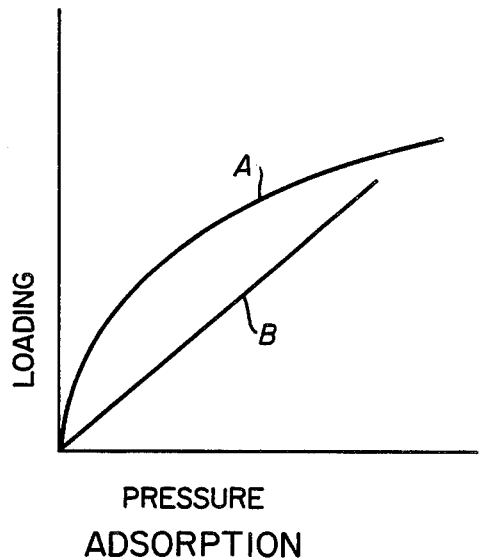
FIG. 2 is a graphical representation of typical adsorption characteristics of a conventional single-stage, single component adsorption process.
Figure 3:
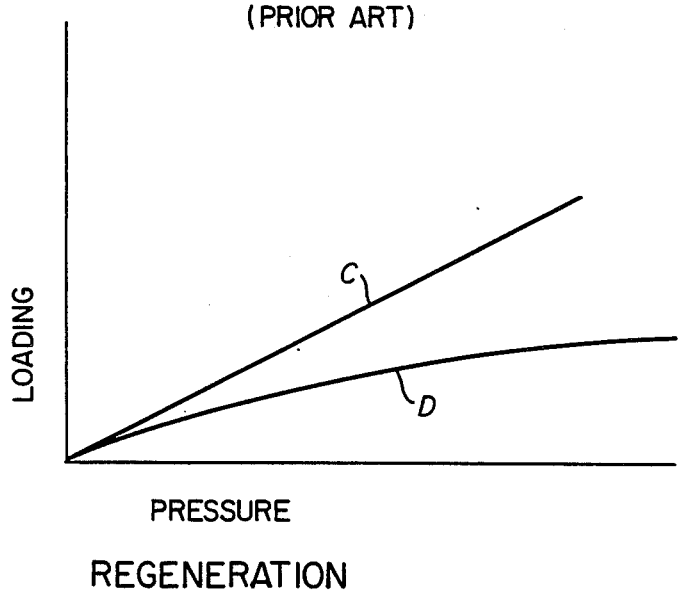
FIG. 3 is a graphical representation of typical desorption or regeneration characteristics of a conventional single-stage, single component adsorption process.

The advantage of the dual-stage adsorption system of this invention over conventional single-stage adsorption systems can be more clearly demonstrated with reference to FIGS. 2–5. FIGS. 2 and 3 illustrate, respectively, the adsorption and desorption behavior of a conventional single stage adsorption system and FIGS. 4 and 5 illustrate, respectively, the adsorption and desorption behavior of the dual-stage adsorption system of this invention. The graphs show adsorbent loading as a function of component pressure level. That pressure level can be the pressure of the system if the gas phase is essentially only the component to be adsorbed or it can be partial pressure of the component to be adsorbed if that component is part of a gas mixture of itself and one or more inert gases.

For the single-stage system the adsorption stage is illustrated in FIG. 2, which shows loading as a function of pressure for both the equilibrium characteristic of the system (curve A) and the operating characteristic of the system (curve B). The equilibrium is the locus of adsorbent loadings at each pressure level or partial pressure that correspond to the maximum loading possible at that condition. In order for actual systems to remove the component from the gas phase onto the adsorbent itself, the operating line is below the equilibrium line at any given partial pressure involved. In this manner there is always a driving force to transfer the component to be removed from the gas phase onto the adsorbent itself.

Once the adsorbent bed is loaded with the component to be removed to the extent desired, i.e., to the design point, then the regeneration phase of the process is undertaken and this is illustrated in FIG. 3. FIG. 3 also shows adsorbent loading as a function of pressure level and illustrates the operating line (curve C) above the equilibrium line (curve D). The equilibrium line shows a lower loading at a given pressure level compared to the adsorption stage since that equilibrium line is at a higher temperature than the adsorption. Also as shown, the outlet pressure level, i.e., partial pressure or contaminant level in the exiting gas phase, is shown to be higher than in the adsorption phase which would correspond to that situation where the purge gas flow is less than the feed gas flow. This would need to be the case for that situation where one would wish to regenerate the bed with less gas than the feed gas. As can be seen from an examination of FIG. 3, the operating line must be higher than the equilibrium line at every point of the process in order to result in complete regeneration of the adsorbent bed. Accordingly this means that for a single component system, the temperature that must be utilized is relatively high in order to reduce equilibrium loading at a given pressure level to relatively low values and thereby allow the operating line to be above the equilibrium line at reasonable amounts of purge gas. If one were to move the operating line to a lower outlet concentration (partial pressure) in the purge gas, then the corresponding temperature for regeneration would decrease but the amount of gas involved would increase.

The characteristics of the dual-stage adsorption system for a single component of this invention are illustrated in FIGS. 4 and 5. FIG. 4 shows adsorption characteristics of the process of this invention and FIG. 5 shows regeneration characteristics for the process of this invention. For adsorption at a similar temperature as with the single-stage system, the adsorbent loading versus pressure level is illustrated with the top equilibrium line (curve E) and the bottom two part operating line (curve F). As was the case with the single stage system, the operating line must be below the equilibrium line in order to maintain driving force for transfer of component from the gas phase to the solid adsorbent phase. The total loading differential for the adsorbent is the same for the two stages as for the single-stage at the given process conditions. Since there are involved two separate adsorption stages and the total differential for adsorption is the same as for the single-stage, this means that the adsorbent required for the two-stage system is greater than the adsorbent requirement for the single-stage system. This characteristic is a direct result of the fact that the differential loading, i.e., for each stage, is less than that associated with the single stage and, accordingly, in order to handle removal of the same amount of adsorbed component, the adsorbent requirement is increased.

The characteristics of the regeneration phase of the two-stage system of this invention are illustrated in FIG. 5 which shows loading versus pressure level with the operating line (curve G) above the equilibrium (curve H) in order to supply a driving force for removal of adsorbed material from the adsorbent to the regenerating gas stream. Assuming that the regeneration gas is initially a clean gas relative to the adsorbed component, the gas requirement for regeneration will actually be somewhat less than for the single-stage system since the second stage gas has the same outlet composition as the single stage, but needs to remove less material than the single-stage by nature of the fact that the first stage removes some material. However, the primary difference is the required regeneration temperature and therefore the regeneration energy requirement. Since the two stage operating line does not require the same gas flow for each stage, it can follow the equilibrium line more readily and can do so in that situation where the equilibrium line is at a lower temperature as shown by higher loadings at a given pressure level compared to the single stage system. Accordingly this means that the two stage system can be regenerated with considerably less regeneration energy requirement than the single stage system.

Note that this comparison illustrates the situation at essentially the same regeneration gas composition levels for the single and dual-stage system in order to identify the temperature variation and thereby the lower energy requirement. However, the two stage system does not necessarily have to have the same regeneration conditions as a single stage system and regeneration gas composition and temperature requirement will be an optimization which is dependent on system process parameters and cost factors. In some situations it may be that it would be desirable to reduce regeneration gas and thereby require somewhat higher regeneration temperatures or vice versa. In any event the two stage system of this invention reduces regeneration energy requirements as a trade off and compensation for larger loading requirements relative to a single-stage system. Accordingly, dependent on the cost factors involved regarding adsorbent cost, regeneration gas cost, and regeneration heat or energy cost, the two-stage system of this invention is more advantageous for removal of a single component than the single-stage systems heretofore employed.

FIGS. 4 and 5 illustrate the situation where the inlet of the first stage and the outlet of the second stage are identical. It is preferred that these end points be close. However there are situations where the inlet of the first state and the outlet of the second stage are not identical and these situations are characterized by a discontinuous operating line as illustrated in FIGS. 6 and 7. However the basic principles of operation of the invention, and advantages attainable thereby, apply to the situation characterized by a discontinuous operating line as well as the situation characterized by a continuous operating line.

The optimization of multiple stages for the present invention is related to process parameters including adsorbent loading characteristics, regeneration gas availability and cost, and energy cost factors. Generally, these optimizations will resolve themselves such that an optimum system is one wherein the operating line for the regeneration "follows the equilibrium line" in the sense that the driving force at any given composition between the operating line and equilibrium line is not significantly different. Since loading characteristics for adsorbents at a given temperature generally tend to be asymptomatic with pressure (that is partial pressure), it has been found that typically optimization between the stages is reasonably close to optimum if the composition in the intermediate gas phase is chosen such that the ratios of inlet and outlet compositions in the two stages are within a factor of 5 of one another, preferably within a factor of 2 of one another and most preferably are approximately equivalent. For example, if a gas stream contained 1000 ppm of a component, and it was desired to clean the gas stream to 0.1 ppm, then the intermediate component content should most preferably be about 10 ppm resulting in a stage composition ratio of 100 (1000:10:0.1).

This invention is advantageously utilized only for removal of a component from a gas stream to a very high degree, i.e., to low exit concentrations of the removed component. Generally, it is expected that this staged syste would be advantageous only if the outlet concentration needs to be less than 5 ppm. If the component needs to be removed to concentration levels above 5 ppm, single stage systems would be satisfactory. This situation is related to the fact that the staged or combined bulk and trace removal arrangement allows regeneration of the bulk removal adsorbent mass only to high residual loadings with the concurrent regeneration energy savings. For example, with water as the removed component and molecular sieve as the adsorbent, bulk removal of the water from 5 to 50 ppm allows adsorbent regeneration at about 1200 BTU per pound of water and with high residual water loading on the adsorbent. Trace removal of the water below 5 ppm requires almost 50% added regeneration energy (per unit of water) and low residual water loading on the adsorbent. The staged arrangement takes advantage of the low unit energy requirement for removal of the majority of the water component.

The following example serves to further demonstrate the advantages attainable by use of the process of this invention. The example is presented for illustrative purposes and is not intended to be limiting.

Air at 40° F. and atmospheric pressure containing 1200 parts per million (ppm) of water as the component to be removed is fed to a first adsorption bed at a rate of 250,000 pounds per hour. The first adsorption bed is a moving bed through which 13× molecular sieve adsorbent is passed countercurrently to the air at a rate of 2000 pounds per hour and increases in water loading from the residual of 17 pounds to 27 pounds of water per 100 pounds of adsorbent. The air exiting the first adsorber is passed countercurrently through a second adsorber against 13× molecular sieve. The sieve flowrate through the second adsorber is 1700 pounds per hour and increases in water loading from the residual of 5.1 pounds to 5.2 pounds of water per 100 pounds of adsorbent. The air exits the second adsorber containing about 0.1 ppm of water.

For comparative purposes, a similar air stream is cleaned of water by use of a conventional single-stage adsorption system using a sieve flowrate of 909 pounds per hour with water loading from the residual of 5 pounds to 27 pounds of water per 100 pounds of adsorbent. The results of the single-stage process, as well as that of the comparable dual stage process of this invention are listed in Table I. The designation "Mbtu" mean thousand btu.

TABLE I

| Performance Parameters | Single-Stage | Dual-Stage |
| --- | --- | --- |
| Intermediate Gas Water Content (ppm) | — | 10 |
| Sieve Flow, lb/hr | 909 | 2000 (1st stage) 1700 (2nd stage) |
| Regeneration Heat (M btu/hr) | 410 | 300 |
| Energy Savings (%) | — | 27 |

As can be seen from Table I, the conventional single-stage system enables the air stream to be dried with a sieve flow of approximately one quarter of that required by the dual stage system of this invention. However, the regeneration energy requirement for the dual-stage system of this invention is 27 percent less than that of the conventional single-stage system, and this energy savings more than compensates for the greater capital costs of the dual-stage system.

The process of this invention has been described in detail with reference to certain specific embodiments and in particular with reference to a two stage system.

It is understood that there are other embodiments within the scope and spirit of the claims other than those embodiments specifically described. For example, the process of this invention may be employed to clean a gaseous stream of a single component by passage through three or more stages.

We claim:

1. A process for the removal by adsorption of a single component from a gaseous stream comprising:
   (a) passing a gaseous stream containing a component to be removed in contact with a first mass of adsorbent to transfer the majority of said component to the first mass of adsorbent and reduce the concentration of said component in the gaseous stream to within the range of from 5 to 50 ppm;
   (b) passing the resulting gaseous stream in contact with a second mass of adsorbent, separate from the first mass of adsorbent, to transfer remaining component to the second mass of adsorbent and reduce the concentration of said component in the gaseous stream to less than 5 ppm;
   (c) loading each of the adsorbent masses to at least 90 percent of its capacity;
   (d) regenerating the first adsorbent mass to a high residual loading; and
   (e) regenerating the second adsorbent mass to a low residual loading.

2. The process of claim 1 wherein the component concentration in the gaseous stream after the first mass of adsorbent is within the range of from 5 to 20 ppm.

3. The process of claim 1 wherein the component concentration in the gaseous stream after the second mass of adsorbent is less than 2 ppm.

4. The process of claim 1 wherein at least one of the first and second mass of adsorbent contacts the gaseous stream in a fixed bed.

5. The process of claim 1 wherein at least one of the first and second mass of adsorbent contacts the gaseous stream in a moving bed.

6. The process of claim 5 wherein the contact in the moving bed is cocurrent.

7. The process of claim 5 wherein the contact in the moving bed is countercurrent.

8. The process of claim 1 wherein the first and second mass of adsorbent are the same type of adsorbent.

9. The process of claim 1 wherein the first and second mass of adsorbent are different types of adsorbent.

10. The process of claim 1 wherein at least one mass of adsorbent is molecular sieve.

11. The process of claim 1 wherein the gaseous stream is air and the component to be removed is water.

12. The process of claim 1 wherein at least one of the regenerations is carried out by changing the pressure on the adsorbent mass.

13. The process of claim 1 wherein at least one of the regenerations is carried out by changing the temperature of the adsorbent mass.

14. The process of claim 1 wherein at least one of the regenerations is carried out by contacting purge gas in countercurrent flow with the adsorbent mass.

15. The process of claim 14 wherein both regenerations are carried out by contacting purge gas in countercurrent flow with adsorbent mass.

16. The process of claim 15 wherein at least a part of the purge gas after regeneration of the second adsorbent mass is employed to make up at least part of the purge gas requirement for the regeneration of the first adsorbent mass.

17. The process of claim 1 wherein the ratio of the component concentration in the gaseous stream prior to contacting the first adsorbent mass to the component concentration in the gaseous stream after contacting the first adsorbent mass is within a factor of five of the ratio of the component concentration in the gaseous stream prior to contacting the second adsorbent mass to the component concentration in the gaseous stream after contacting the second adsorbent mass.

18. The process of claim 1 wherein the high residual loading is at least twice the low residual loading.

19. The process of claim 1 wherein the adsorbent is molecular sieve, the gaseous stream is air and the component to be removed is water, and wherein the first adsorbent mass is regenerated to a high residual loading of at least 12 pounds of water per 100 pounds of adsorbent and the second adsorbent mass is regenerated to a low residual loading of not more than 6 pounds of water per 100 pounds of adsorbent.

20. The process of claim 1 wherein each adsorbent mass is loaded to at least 95 percent of its capacity.

* * * * *